United States Patent [19]

Moore

[11] 3,913,408
[45] Oct. 21, 1975

[54] APPARATUS FOR CONTROLLING EPICYCLIC MOTION OF A ROTOR IN A ROTARY ENGINE

[76] Inventor: Barry Anthony Moore, Box 255, Malton Postal Station, Mississauga, Ontario, Canada

[22] Filed: Feb. 28, 1974

[21] Appl. No.: 446,631

[52] U.S. Cl. .................. 74/63; 418/54; 74/805; 74/52
[51] Int. Cl.².. F16H 37/12; F01C 1/02; F16H 1/28; F16H 21/12
[58] Field of Search ................ 74/52, 805, 804, 63; 418/54, 61 A

[56] References Cited
UNITED STATES PATENTS
2,506,736  5/1950  Oschwald .......................... 74/52
3,192,799  7/1965  Pamplin ............................ 74/805

Primary Examiner—Samuel Scott
Assistant Examiner—Wesley S. Ratliff, Jr.

[57] ABSTRACT

An apparatus for controlling epicyclic motion of a rotor in a rotary engine is disclosed. The apparatus comprises: an internal gear secured to said rotor; an eccentric mounted within the rotor and adapted to rotate therein, the drive shaft extending through the eccentric and being permitted to rotate within the eccentric; an external gear secured to the drive shaft and adapted to mesh with the internal gear; and means for synchronizing the rotational movement of the rotor to permit the rotor to rotate within the engine chamber, the speed ratio of the angular velocity of the eccentric to the angular velocity of the rotor being equal to the number of symmetrically spaced-apart lobes. Due to the controlled motion of the rotor within the chamber, the rotor tips may be provided with slidable vanes which contact the circumferential wall of the chamber due to centrifugal forces acting on the slidable vanes. The apparatus may be adapted for use in rotary internal combustion engines, hydraulic pumps, compressors and the like where there may be any number of lobes on the rotor.

The apparatus does not restrict rotary engine design as is experienced with other types of apparatus for performing the same function and it permits varying of the drive shaft speed independently of the rotor speed where the drive shaft may rotate in the same direction, remain stationary or rotate in the opposite direction to the rotor.

5 Claims, 9 Drawing Figures

APPARATUS FOR CONTROLLING EPICYCLIC MOTION OF A ROTOR IN A ROTARY ENGINE

FIELD OF INVENTION

This invention relates to an apparatus for controlling epicyclic motion of a rotor revolving about a drive shaft in a rotary engine, wherein the angular velocity of the drive shaft can be varied independently of the angular velocity of the rotor.

BACKGROUND OF INVENTION

In the well-known Wankel internal combustion rotary engine having a tri-lobed rotor, the eccentric on the drive shaft controls the epicyclic motion of the rotor as it moves about the drive shaft. The eccentric is secured to the drive shaft so that for every 120° revolution of the rotor, the eccentric hub must rotate 360° to achieve the desired motion of the rotor in the combustion chamber. Therefore the rotational speed of the drive shaft is fixed with respect to the rotational speed of the rotor which in turn determines the gear ratio between the internal gear secured to the rotor and the external gear secured to the drive shaft. For the tri-lobed rotary engine, the gear ratio of the internal gear to the external gear is 3:2.

The centrifugal forces arising from high rotational speeds of the rotor exert a large reaction force on the drive shaft by way of the bearing means between the eccentric and the rotor. In some types of rotary engines, such centrifugal forces may be absorbed by the rotor tips reacting against the stator wall of the chamber. With that type of rotary engine, the reactive forces between the rotor tips and the stator wall of the combustion chamber create excessive tip wear and in most cases the rotor must have at least three rotor tips to equally distribute the reactive forces so that the rotor follows the desired planetary motion as it rotates within the chamber. To ensure the rotor follows the prescribed motion the configuration of the chamber should be machined very accurately so that the rotor tips always contact the circumferential wall of the chamber in the appropriate manner.

When it is desired to construct a bi-lobed rotary engine it is usually necessary to provide an eccentric on the drive shaft to guide the rotor in a planetary motion about the drive shaft because without a third rotor tip contacting the stator wall of the combustion chamber, the rotor can move freely about in the chamber. However, by securing an eccentric on the drive shaft to eliminate reactive forces at the rotor tips and to permit the operation of a bi-lobed rotary engine wherein the rotor rotates in a planetary motion within the combustion chamber, the design of the rotary engine is significantly restricted particularly with respect to the rotational speed of the drive shaft. As mentioned, in a tri-lobed Wankel rotary engine, the drive shaft must make three revolutions for every revolution of the rotor.

The apparatus according to this invention overcomes the problem of restricted rotary engine design by providing an apparatus for controlling the epicyclic motion of the rotor about the drive shaft of a rotary engine wherein the drive shaft rotates independently of the eccentric and the angular velocity of the drive shaft is not fixed with respect to the angular velocity of the rotor. The apparatus comprises an internal gear secured to a rotor with its axis coincident with the axis of the rotor and an eccentric which is adapted to rotate within the rotor with its longitudinal axis coincident with the axis of the rotor. The drive shaft extends through the eccentric with its axis parallel to the axis of the rotor and is permitted to rotate relative to the eccentric. An external gear is secured to the drive shaft where the drive shaft is positioned in the eccentric to permit the external gear to engage the internal gear, the distance between the axis of the drive shaft and the axis of the rotor being equal to one half the difference between the pitch diameters of the internal gear and the external gear. The rotational movement of the eccentric with respect to the rotational movement of the rotor is synchronized by means therefor to permit the rotor to rotate within the combustion chamber where the tip of each rotor lobe slidably contacts the circumferential wall of the engine chamber to define a number of isolated zones equal to the number of lobes. The speed ratio of the angular velocity of the eccentric to the angular velocity of the rotor is equal to the number of symmetrically spaced apart lobes. The means for synchronizing the rotational movement of the eccentric may include a gear train which is adapted to transmit to said eccentric the rotational movement of the drive shaft which is induced by the rotational movement of the rotor where the overall gear ratio of the gear train from the drive shaft to the eccentric is predetermined by the number of symmetrically spaced apart lobes on the rotor to rotate the eccentric at the proper speed ratio.

Depending upon the gear ratio between the internal gear and the external gear, the drive shaft may either rotate in the same direction as the rotor, remain stationary, or rotate in the opposite direction to that of the rotor. The gear ratio at which the drive shaft remains stationary depends upon the number of lobes on the rotor. For example, with a bi-lobed rotor, the gear ratio of the internal gear to the external gear is 2:1, for a tri-lobed rotor the gear ratio is 3:2 and for a four-lobed rotor the gear ratio is 4:3.

The above-mentioned gear train may be constructed in a number of ways as would be apparent to those skilled in the art. Certain arrangements may be substantially more compact than other as is discussed in detail hereinafter. For example, the gear train may comprise a first gear secured to the drive shaft, first and second interconnected back gears and a second gear mounted on the drive shaft which is adapted to rotate freely of the drive shaft. The first and second back gears are mounted on a lay shaft which is in turn positioned within the stator such that the first back gear engages the first gear and the second back gear engages the second gear. The second gear is connected to the eccentric to rotate the eccentric about the drive shaft at the angular velocity thereof. The gear ratio of the gear train between the first and second gears is such that the second gear rotates at the proper speed to meet the requirements of the respective speed ratio.

When it is desired to operate the rotary engine with the drive shaft remaining stationary, the first gear and the first back gear are eliminated and the power produced by the engine is derived from the lay shaft which is driven by second back gear as it engages the second gear secured to the eccentric. Such an arrangement is advantageous when it is desired to rigidly secure the drive shaft in the stator to absorb extreme centrifugal loads exerted by a rotor rotating at high speed or in an engine with high power output.

In the instance where the drive shaft rotates in a direction opposite to that of the rotor, it is necessary to incorporate an idler gear between the first gear and the first back gear or the second gear and the second back gear so that the eccentric rotates in the same direction as the direction of rotation of the rotor. As the diameter of the internal gear relative to the diameter of the external gear increases, that is an increasing gear ratio therebetween, the speed of the drive shaft decreases until the ratio at which the drive shaft remains stationary is reached and thereafter, the drive shaft speed begins to increase. Therefore, depending upon design requirements, a desired drive shaft speed may be obtained by varying the ratio between the external and internal gears on the rotor and the drive shaft respectively.

With the eccentric rotatably mounted on the drive shaft and its mode of rotation controlled by the gear train assembly the reactive forces between the tips of the rotor lobes and the stator wall are substantially reduced. The reactive forces may be eliminated if there is no slack or clearance between the bearing surfaces which permit the rotor to rotate independently of the eccentric and drive shaft. By controlling the planetary motion of the rotor, the rotor tips may carry slidable vanes, each of which moves outwardly due to centrifugal force to contact the circumferential wall of the chamber. The configuration of the chamber may therefore vary from that prescribed by the locus of points defined by the planetary motion of the tips of a rotor lobe. The slidable vanes carried by the rotor may slide in and out of the rotor tips to accommodate these small variations of the chamber configuration where the limitation of such variations would fall within that prescribed by the distance the vanes may slide. It is understood that the dimensions of the chamber would always have to be sufficient to permit free rotary motion of the rotor without interference between the body portion of the rotor tip and the chamber wall. As a result, accurate machining of the circumferential wall of the chamber as defined by the path of travel of the rotor tips is not required.

SUMMARY OF THE INVENTION

It is an object of the invention to provide an apparatus for controlling the planetary motion of a rotor about a drive shaft in a rotary engine.

It is a further object of the invention with the above apparatus to permit the drive shaft speed to be varied independently of the rotor speed.

It is another object of the invention to provide the rotor tips with slidable vanes to permit variations in the shape of the chamber within the limits defined by the degree of movement of the slidable vanes.

It is another object of the invention to provide a compact arrangement of a gear train housed by an eccentric mounted on the drive shaft for controlling the planetary motion of the rotor.

It is yet another object of the invention to provide a rotary engine wherein the direction of the drive shaft rotation may be varied independently of the direction of rotation of the rotor.

It is a further object of the invention with the above apparatus to provide a cylindrical chamber for use in a bi-lobed rotary engine having slidable vanes in the tips of the rotors.

BRIEF DESCRIPTION OF THE DRAWINGS

These and other objects, features and advantages of the invention are discussed in more detail hereinafter, in association with the accompanying drawings in which.

DETAILED DESCRIPTION OF THE PREFERRED EMBODIMENTS

Figure 1:
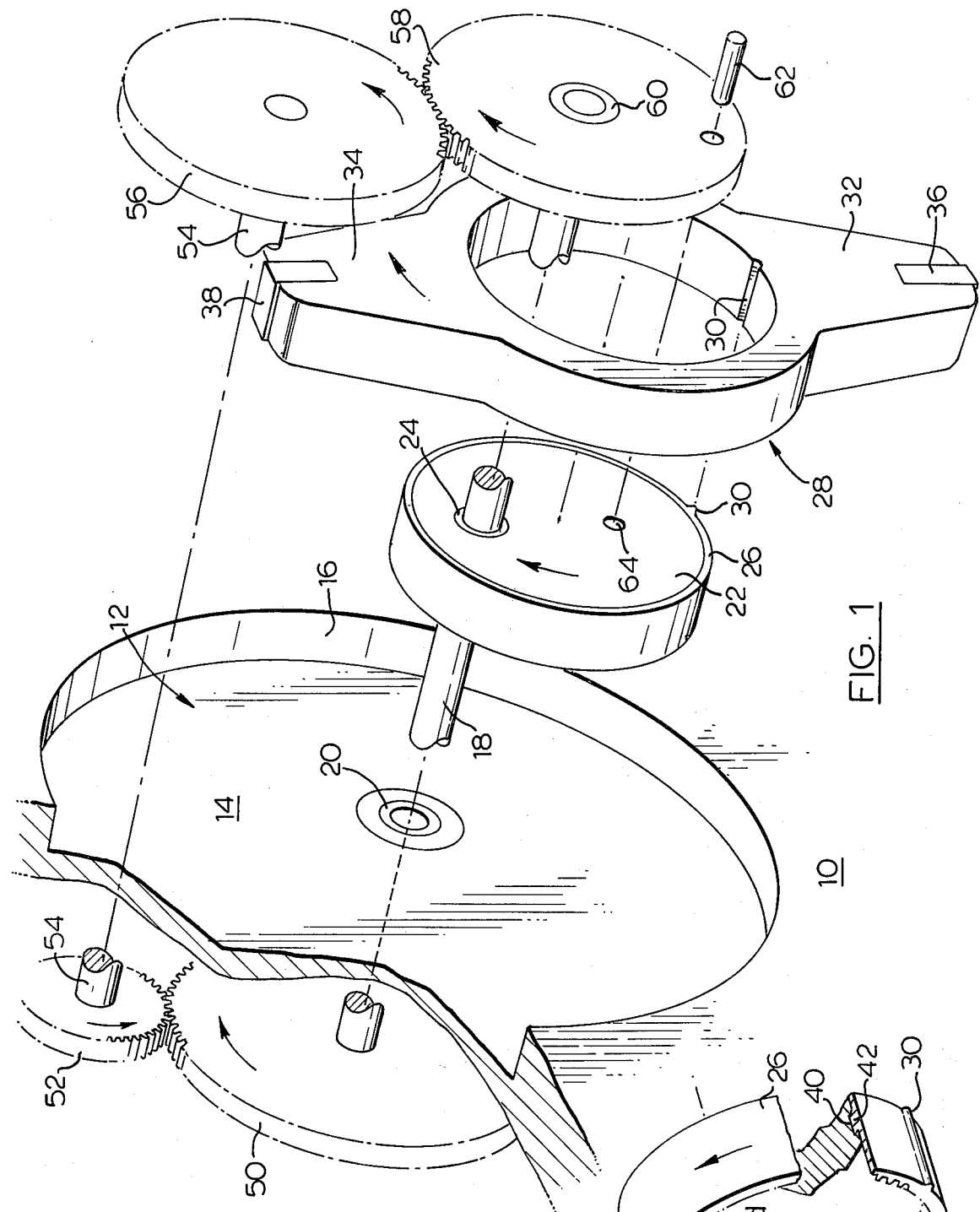
FIG. 1 is an exploded view of the apparatus according to a preferred embodiment of the invention for controlling epicyclic motion of a rotor rotating about a drive shaft in a rotary engine.

In FIG. 1 of the drawings, a schematic view of the apparatus according to a preferred embodiment of the invention is shown. The model rotary engine is housed in a stator 10 having an open-sided cylindrical chamber 12 defined by a side wall 14 and a circumferential wall 16. The other opposing side wall of the stator is not shown, for sake of clarity in illustration. A drive shaft 18 extends through side wall 14 and is mounted in bearing 20 which permits the drive shaft 18 to rotate with respect to the stator. An eccentric 22 is mounted on the drive shaft 18 by way of bearing 24 which permits the drive shaft to rotate therein. A collar 26 surrounds eccentric 22 where the eccentric is permitted to rotate relative to the collar 26. A rotor 28 slips over collar 26 and is keyed to the collar by key means 30 so that the collar 26 is rigidly secured to the rotor 28. The rotor has two lobes 32 and 34 and at the extremity of each lobe, slidable vanes 36 and 38 respectively, are positioned. The vanes are permitted to slide inwardly and outwardly to ensure contact with the circumferential wall 16 as the rotor rotates within chamber 12.

Figure 2:
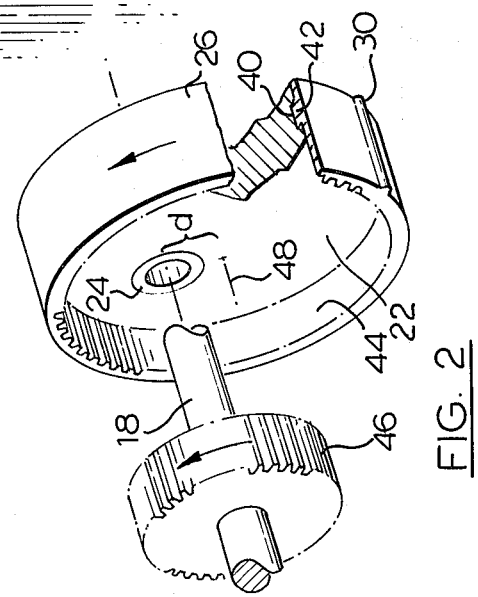
FIG. 2 is an exploded view of the drive shaft extending through the eccentric.

FIG. 2 shows in more detail the inner construction of the eccentric 22 and the manner in which the drive shaft 18 passes therethrough. The eccentric 22 is mounted in collar 26 in a tongue and groove manner where an annular groove 40 in the eccentric cooperates with a ridge 42 on the inside of collar 26 to retain the eccentric within the collar 26. The thickness of eccentric 22 does not equal the thickness of collar 26 and around the remaining inside portion of the inner surface of collar 26, an internal gear 44 is secured thereto. Therefore the rotational movement of rotor 28 is directly transmitted to the internal gear 44 by way of key means 30.

An external gear 46 is secured to drive shaft 18 and bearing 24 is positioned in the eccentric 22 to permit the external gear 46 to engage the internal gear 44 and properly mesh therewith. The eccentric 22 has a longitudinal axis 48 which is coincident with the axis of rotor 28. The longitudinal axis of drive shaft 18 is located a distance "d" from the longitudinal axis 48 of eccentric 22, where "d" is equal to one half the difference between the pitch diameters of the internal gear 44 and the external gear 46. The longitudinal axis 48 of the eccentric 22 is parallel to and orbits about the longitudinal axis of the drive shaft 18.

The rotor 28 as it rotates about drive shaft 18 within chamber 12 follows a planetary or epicyclic movement where the motion of the rotor is controlled by the movement of the eccentric 22 about the drive shaft 18 to ensure that the slidable vanes 36 and 38 of the rotor 28 are continuously in contact with the circumferential wall 16 during rotation of rotor 28. A gear train is used to control the movement of eccentric 22 and it comprises a first gear 50 secured to drive shaft 18 as it extends outwardly beyond the side wall 14. The first gear 50 engages a first back gear 52 which is secured to a lay shaft 54. The lay shaft is rotatably mounted in the stator and extends therethrough to the front face of the stator. A second back gear 56 is secured to the lay shaft. A second gear 58 is mounted on drive shaft 18 and is permitted to rotate independently of the drive shaft by means of bearing 60. The rotational movement of the second gear 58 is transferred to the eccentric 22 by way of a pin 62 passing through the second gear 58 and being press fitted into a hole 64 bored in the eccentric 22.

To obtain optimum efficiency, the two isolated zones which are defined by slidable vanes 36 and 38 as they slidably contact the circumferential wall 16 should both reach a minimum volume for each revolution of the rotor. In so doing, the eccentric 22 must make two revolutions. Therefore the angular velocity of the eccentric is two times the angular velocity of the rotor. In controlling the angular velocity of the eccentric 22, the first gear 50 transmits the rotational movement of the drive shaft 18 to the second gear 58 by way of the first and second back gears 52 and 56 respectively. The overall gear ratio of the gear train between the first gear 50 and the second gear 58 must be such that the angular velocity of the eccentric is twice the angular velocity of the rotor 28. The angular velocity of the drive shaft 18 is determined by the gear ratio between the internal gear 44 and the external gear 46, therefore, in knowing the parameters of the system, the gear ratio between first gear 50 and second gear 58 can be determined.

Although a bi-lobed rotor is shown in FIG. 1, it is understood that the apparatus according to this invention may be used with other types of rotary engines involving a planetray rotoray motion. For example, in the Wankel rotary engine having a tri-lobed rotor, the gear ratio between the first and second gears of the apparatus would have to be selected to ensure that the eccentric rotates three times faster than the rotor. Similarly, with a four-lobed rotor, the eccentric should rotate four times faster than the rotor, where the change in the angular velocity of the eccentric is accommodated by varying the gear ratio of the gear train between the first and second gears.

Figure 3:
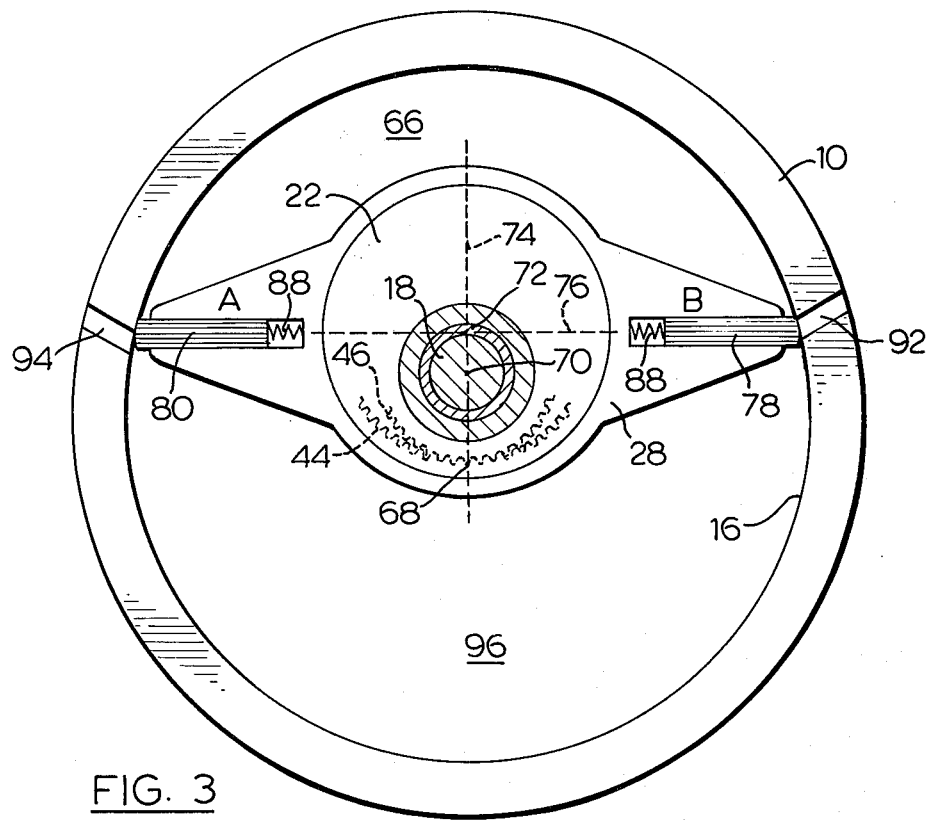
FIG. 3 is a cross-sectional view of the rotary engine in FIG. 1 as viewed along the longitudinal axis of the rotary engine.

FIG. 3 is a view of the rotary engine shown in FIG. 1 less the apparatus for controlling the epicyclic motion of the rotor. The rotor tips contact the circumferential wall 16 of the chamber to define isolated zones 66 and 96. The volume of isolated zone 66 as defined by the chamber walls is at a minimum for the rotor position shown. At this stage of rotor rotation, the contact point 68 between the external and the internal gear, the centre of the external gear 70 and the centre 72 of the eccentric 22 all fall on line 74 drawn therethrough; and a line 76 drawn between the tips of rotor 28 intersects line 74 at substantially right angles.

Figure 9:
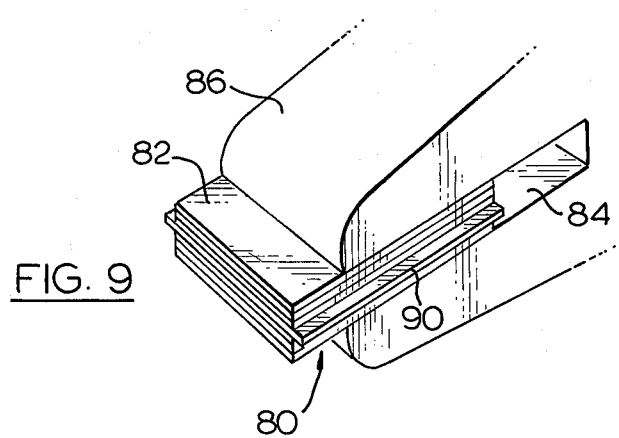
FIG. 9 is an isometric view of a rotor lobe tip having a slidable vane.

The tips of rotor 28 carry slidable vanes 78 and 80 which are different from those shown in FIG. 1, each consisting of a plurality of shims. A more detailed view of this tip construction is shown in FIG. 9 where the shims or leaves 82 are stacked one besides the other to form a thickness substantially equal to the width of slot 84 formed in the rotor tip 86. A spring 88 ensures that the shims slide outwardly to maintain contact with the circumferential wall 16 at all times, the shims being slidable one with respect to the other so that a plurality of point contacts are established at the circumferential wall to effect a seal superior to that which could be established by a single point contact between a slidable vane and the circumferential wall. The central shim or shims of the slidable vane 80 may be expandable in a lateral direction as exemplified by shim 90 to ensure contact with opposing side walls of the chamber 12. In order to facilitate free sliding between the plurality of shims 82, the spacing of slot 84 should be sufficient to permit the sims to slide relative to each other. The spring 88 may be arranged to yieldably urge the shims outwardly independently of each other, thereby ensuring that the outer extremities of all of the shims contact the circumferential wall 16 of the chamber during rotational of the rotor.

As previously discussed, for a bi-lobed rotor, the eccentric 22 rotates twice for every revolution of the rotor 28. This motion is controlled by the gear train as shown in FIG. 1. Starting with the position shown in FIG. 3 and providing the gear train remain synchronized, a 180° revolution of the rotor requires that the eccentric 22 turn one complete revolution. Depending upon the gear ratio between the internal gear 44 and the external gear 46, the drive shaft may rotate in the same direction as the rotor, remain stationary or rotate in a direction opposite to that of the rotor. Consider withdrawing the drive shaft and the rotor from the chamber and holding the drive shaft stationary and rotating the rotor about the external gear 46, the contact point 68 moves around the drive shaft in the direction in which the rotor rotates. For a 180° revolution of the rotor, the contact point 68 should make a 360° revolution. For a gear ratio of 2:1, that is, 40 teeth on the internal gear and 20 teeth on the external gear, the contact point must rotate around the drive shaft 360°. In the contact point turning one revolution, the rotor rotates a number of degrees equal to the difference between the number of teeth on the internal gear and the external gear divided by the number of teeth on the internal gear and multiplied by 360°. For the gear ratio of 2:1, the rotor rotates 180°, therefore the conditions are satisfied and the drive shaft remains stationary.

For a gear ratio greater than 2:1, such as 3:1, the drive shaft will rotate in a direction opposite to that of the rotor. For example, consider 30 teeth on the internal gear and 10 teeth on the external gear, then for a 360° revolution of the contact point 68, the rotor rotates 240°. However, the rotor can only make a 180° revolution for a 360° revolution of the contact point, therefore, the drive shaft must rotate in the opposite direction 60° to place the rotor in the desired position. On the other hand, with a gear ratio less than 2:1, for example, 3:2 where there are 30 teeth on the internal gear and 20 teeth on the external gear, then for a 360° revolution of the contact point 68, the rotor will rotate 120° so that in order for the rotor to make the required 180° revolution, the drive shaft must rotate in the same direction as the rotor 60° to place the rotor in the desired position. From this fundamental principle, the angular velocity of the drive shaft can be determined for any gear ratio between the internal and external gear. For example, with the ratio of 3:1, the drive shaft is rotating in the opposite direction at an angular velocity of one revolution for three revolutions of the rotor. Therefore, the gear ratio between the first gear 50 and the second gear 58 on the apparatus shown in FIG. 1 has to be 6:1 so that the second gear will roate six times faster than the first gear thereby causing the eccentric 22 to rotate 360° for every 60° revolution of the drive shaft. However, for this gear ratio, the additional provision of an idler gear is required between either of gears 50 and 52 or 56 and 58 to ensure that the eccentric rotates in the same direction as the rotor because the drive shaft 18 is rotating in a direction opposite to that of the rotor. For a gear ratio less than 2:1, for example as shown in FIG. 1, no idler gear is required.

Figure 4:
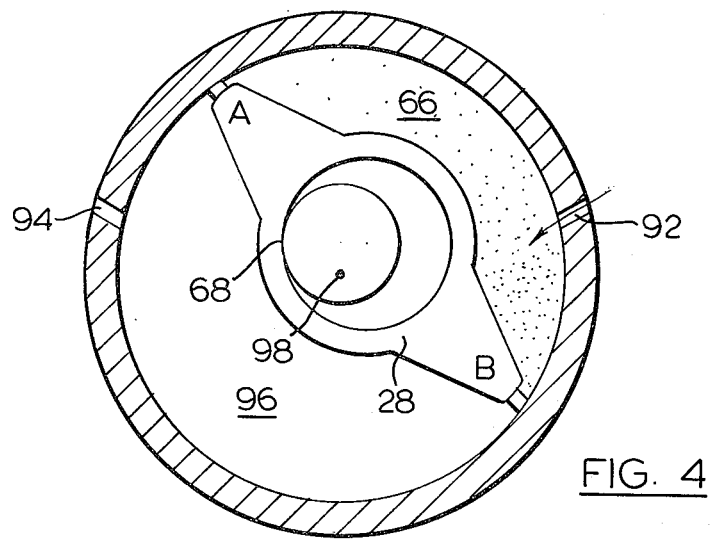
FIGS. 4, 5 and 6 are schematic views of the rotary engine of FIG. 3 showing various phases of intake and exhaust of a bi-lobed rotary engine.
Figure 5:
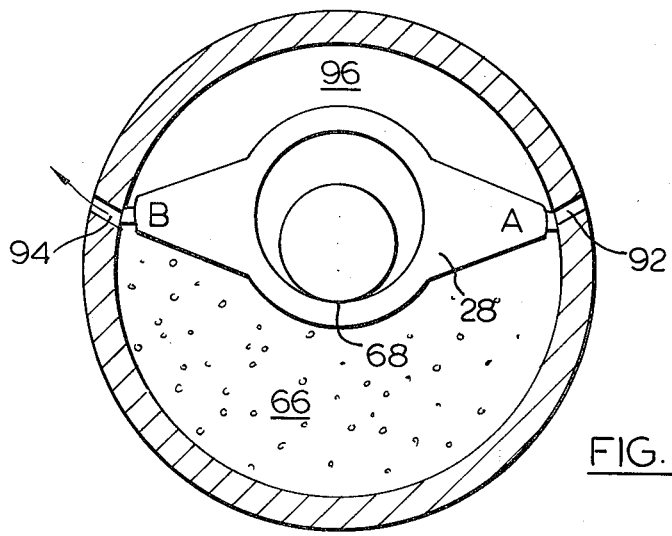
Figure 6:
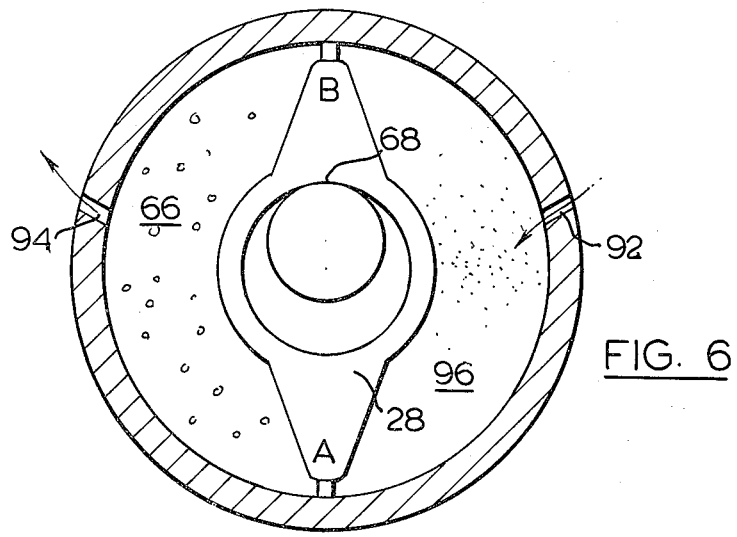

A progression of the rotor as it revolves about the drive shaft 18 within chamber 12 is shown in FIGS. 3, 4, 5 and 6. The bi-lobed rotary engine has many uses such as a hydraulic motor or a fluid compressor so that the location of inlet and exhaust ports 92 and 94 respectively in the stator 10 depends upon the design requirements. In a hydraulic motor, pressurized fluid is forced through intake port 92 and into isolated zone 96 and upon its attempting to escape through exhaust port 94, the rotation of rotor 28 commences, thereby introducing pressurized fluid into isolated zone 66. With a 45° rotation of the rotor 28, the eccentric must make a 90° revolution as shown in FIG. 4. Upon continued rotation of the rotor to the position shown in FIG. 5, the pressurized fluid has expanded in isolated zone 66 while the volume of isolated zone 96 has decreased. The pressurized fluid contained in isolated zone 96 will escape through exhaust port 94 upon further rotation of the rotor to the position shown in FIG. 6. As the volume of isolated zone 66 is decreasing and fluid is expelled through exhaust port 94, further pressurized fluid is introduced through intake port 92 into isolated zone 96 to continue the rotation of rotor 28.

In the sequence of steps shown in FIGS. 3, 4, 5 and 6 to contact point 68 rotates about the drive shaft 18 the required amount to orient eccentric 22 in the proper positions to ensure that the slidable vanes 78 and 80 are continuously in contact with the circumferential wall 16. The positioning of the longitudinal axis of the cylindrical chamber 12 is determined by the limits within which the slidable vanes 78 and 80 may move. In this particular design the longitudinal axis is positioned at centre 98 as shown in FIG. 4. If it is not desired to use slidable vanes, then the configuration of the chamber 12 would be exactly that traced by the motion of the tips of the rotor, in other words, a locus of points defined by the movement of the tips which would be a hypocycloid of a shape determined by the parameters of the system.

Figure 7:
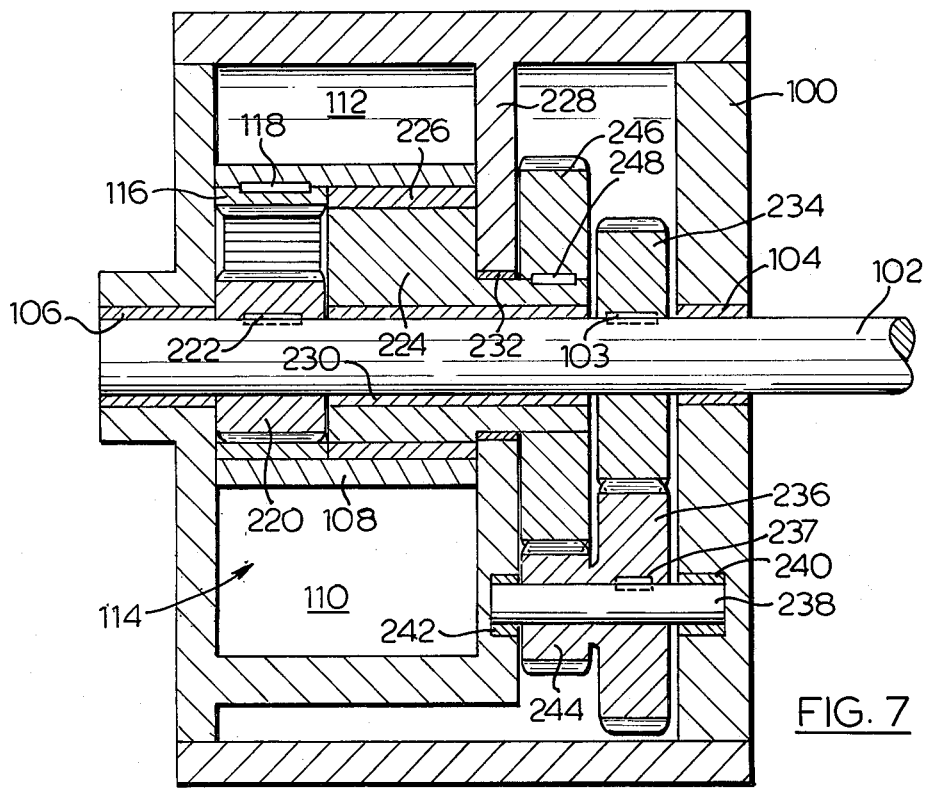
FIG. 7 is an elevational cross-sectional view of a bi-lobed rotary engine according to a preferred embodiment of this invention.

The rotary engine shown in FIG. 7 is somewhat similar in structure to the rotary engine shown in FIG. 1 excepting the gear train for controlling the rotation of the eccentric is differently arranged. The engine is housed in a stator 100 wherein a drive shaft 102 passes through the stator walls and is mounted therein on bearings 104 and 106. Rotor 108 is positioned within chamber 114 so that a line drawn between the tips of the rotor is perpendicular to the plane defined by the section taken of the rotary engine. Two isolated zones 110 and 172 are thereby defined by the two tips of rotor 108 contacting the circumferential wall of chamber 114. An internal gear 116 is keyed to the rotor 108 by key means 118. An external gear 220 is keyed to the drive shaft 102 by key means 222 and is adapted to engage the internal gear 116.

An eccentric 224 is mounted on drive shaft 102 by means of bearings 230 to permit the eccentric 224 to rotate independently of the drive shaft. The eccentric 224 is mounted within rotor 108 by means of bearing 226. A partition wall 228 within the stator 100 isolates chamber 114 from the gear train of the rotary engine. To seal the chamber 114, the eccentric is mounted in bearing means 232 as it passes through the partition wall 228 to preclude lubricants and dirt from entering chamber 114.

In comparing the gear train of the rotary engine of FIG. 7 to that of FIG. 1, a first gear 234 is secured to the drive shaft 102 by key means 103 and a first back gear 236 is keyed to a lay shaft 238. The lay shaft 238 is mounted in bearing means 240 and 242 which are located in the stator and the partition wall 228. A second back gear 244 is integral with the first back gear 236 and is fixed with respect to the lay shaft 238 by key means 237. The second back gear 244 engages a second gear 246 which is secured to the collar of the eccentric projecting outside the partition wall 228 by key means 248.

As previously discussed, depending upon the gear ratio between internal gear 116 and external gear 220, the gear ratio and gear arrangement of the gear train between the first and second gears is selected so as to rotate the eccentric 222 at twice the speed and in the same direction as the rotor 108. When a gear ratio is chosen such that the drive shaft 102 remains stationary, the power produced by the engine would be taken from the rotation of the lay shaft 238 in an appropriate manner.

Seals may be provided on the sides of rotor 108 as it contacts the stator wall and the partition wall 228 to define the isolated zones 110 and 112 and preclude gases from escaping down the sides of the rotor to the exterior of the stator 100. To further assist in the sealing of chamber 114, bearings 106 and 232 may be machined to have a close tolerance with the drive shaft 102 and eccentric 224 respectively.

Figure 8:
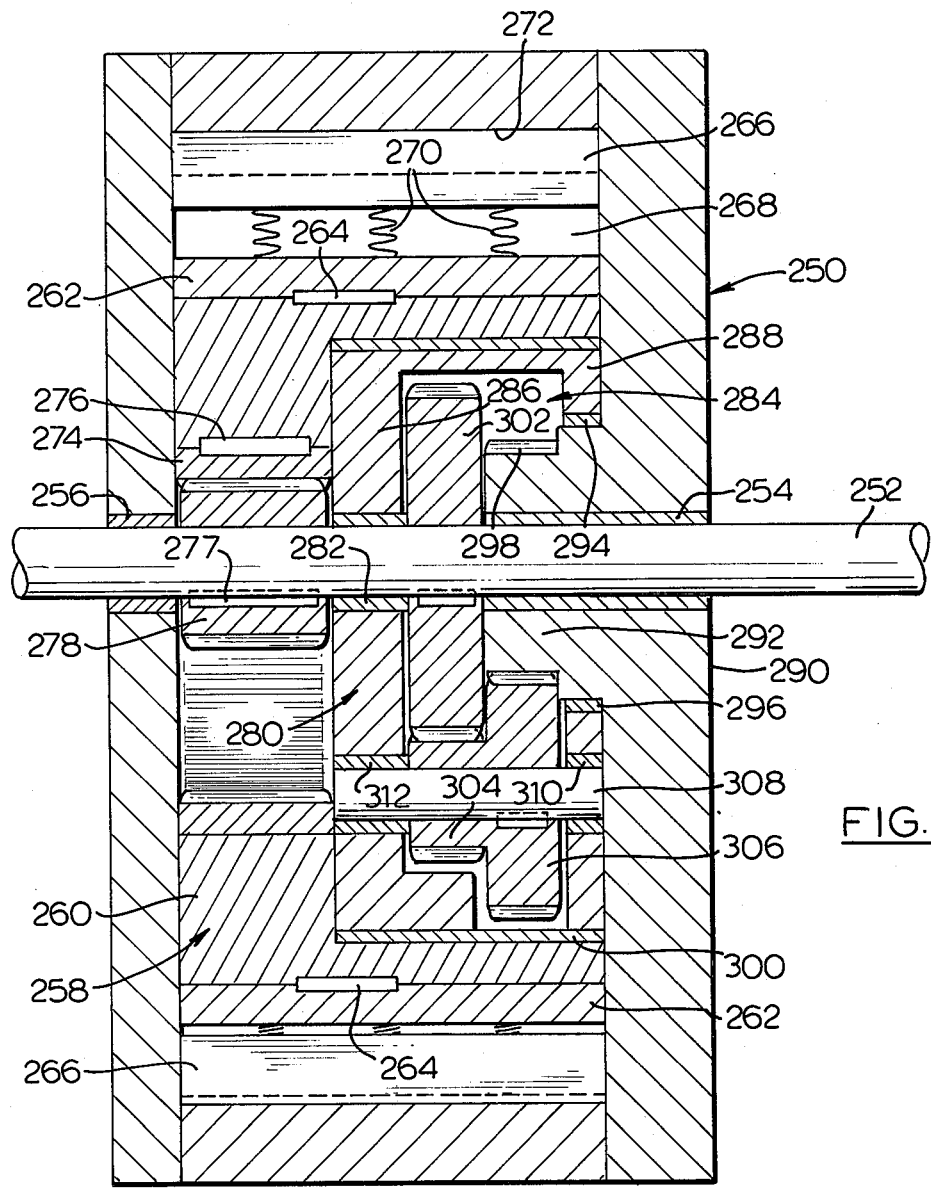
FIG. 8 is an elevational cross-sectional view of a rotary engine according to another preferred embodiment of the invention.

FIG. 8 of the drawings shows an alternative embodiment in arranging the gear train for rotating the eccentric within the rotor. The rotary engine is housed in a stator 250 through which a drive shaft 252 extends and is mounted in bearings 254 and 256. A rotor 258 consists of a main body portion 260 and an outer case-hardened structure 262 which is keyed to the main body by key means 264. The rotor is bi-lobed and the section is taken through a plane passing through the tips of the rotor. The extremities of the rotor lobes carry slidable vanes similar to those shown in FIG. 3 where the vane portion 266 slides in a slot 268 of the rotor tip and the vane is urged outwardly by spring means 270. The slidable vanes 266 at each tip of the rotor slidably contact the circumferential wall 272 of the chamber of the rotary engine. Sealing means may be provided on each side of the rotor 258 which sealably engage the stator side walls to define the isolated zones or working chambers of the rotary engine.

An internal gear 274 is keyed to the main body of the rotor 260 by key means 276 and external gear 278 is keyed to the drive shaft 252 by key means 277 and engages the internal gear 274. An eccentric 280 is mounted on the drive shaft by bearing means 282 where a cavity 284 is formed in eccentric 280, the cavity being defined by side walls 286 and 288 of the eccentric 280. A cylindrical projection 292 extends from the side wall 290 of stator 250 and projects inwardly. The cylindrical projection extends through side wall 288 of the eccentric and has an annular bearing surface 294 which is engaged by bearing means 296 carried by side wall 288. Bearing means 282 and 296 therefore permit the eccentric 280 to rotate about the drive shaft 252. The eccentric 280 is mounted within the main body portion 260 of the rotor and rotates within the rotor by way of bearing means 300.

A first gear 302 is keyed to the drive shaft 252 and engages a first back gear 304. A second back gear 306 which is integral with the first back gear is keyed to a lay shaft 308. The lay shaft is mounted in eccentric walls 286 and 288 by bearing means 310 and 312 and is permitted to rotate therein. The lay shaft is positioned in the eccentric to permit the second back gear 306 to engage a second gear 298 which is integral with the cylindrical projection 292 of the stator.

The gear train of the rotary engines shown in FIGS. 7 and 8 serves the same purpose in both applications, however, the arrangement shown in FIG. 8 is indeed more compact and permits positioning of the gear train within the eccentric. As the rotor 258 moves in a planetary or epicyclic motion about the drive shaft 252, the drive shaft rotates and transfers its rotational motion to the first back gear 304 thereby rotating lay shaft 308. Since the second gear 298 is stationary with respect to the stator, then as the second back gear 306 rotates it causes the lay shaft to move about the drive shaft 252 in a circular path and thereby causes the eccentric to rotate about the drive shaft at the angular velocity of the lay shaft. The gear ratio of the gear train between the first gear 302 and the second gear 298 is chosen to ensure that the eccentric 280 rotates in the prescribed manner.

As discussed hereinbefore, when a gear ratio between the internal gear and the external gear is chosen such that the drive shaft does not rotate then alterations are required in the gear train system. With the rotary engine of FIG. 7, the first gear 234 and the first back gear 236 would be eliminated where the rotary power from the engine would be derived from lay shaft 238 which would extend exterior of the stator 100. In turn, the drive shaft 102 could be rigidly secured to the stator and form part thereof to absorb extreme centrifugal loads placed on the drive shaft during high rotor speeds. With the rotary engine of FIG. 8, the selection of a gear ratio between the internal and external gears which precludes rotation of the drive shaft 252 would require additional means incorporated within the engine to transfer the rotary motion of lay shaft 308 to the exterior of stator 250.

With a gear ratio between the external and internal gears which causes the drive shaft to rotate in a direction opposite to that of the rotor, it is understood that an idler gear would have to be incorporated within the gear train of either rotary engine shown in FIG. 7 or FIG. 8 to ensure that the eccentric rotates in the same direction as the rotor, similar to that discussed with the rotary engine shown in FIG. 1.

An apparatus has therefore been shown in the various embodiments illustrated in the drawings which controls the epicyclic motion of the rotor about the drive shaft in a rotary engine wherein the angular velocity of the drive shaft may be varied independently of the angular velocity of the rotor. The apparatus is particularly useful in bi-lobed rotary engines where the controlled epicyclic motion permits the use of slidable vanes in the rotor tips and its application is shown with regard to a hydraulic pump as shown in FIGS. 3, 4, 5 and 6. It is understood that slidable vanes may also be used in tri-lobed and four-lobed rotors when an apparatus according to this invention is used.

As to lubrication of the apparatus according to this invention the gear train, bearings and other moving parts would be lubricated in a conventional manner to prevent the apparatus from seizing during operation.

While various embodiments of the invention have been described herein in detail, it is understood that variations may be made thereto as will be apparent to those skilled in the art without departing from the spirit of the invention or the scope of the appended claims.

The embodiments of the invention in which an exclusive property or privilege is claimed are defined as follows:

1. An apparatus for controlling epicyclic motion of a rotor rotating about an axis which moves in a circular path about a drive shaft, comprising an internal gear secured to a rotor with its axis coincident with the axis of the rotor; an eccentric being adapted to rotate within the rotor with its longitudinal axis being coincident with the axis of the rotor; a drive shaft extending through said eccentric with its axis parallel to the axis of the rotor and being permitted to rotate relative to said eccentric; an external gear secured to the drive shaft, the drive shaft being so positioned in said eccentric that said external gear engages said internal gear, the distance between the axis of the drive shaft and the axis of the rotor being equal to one-half the difference between the pitch diameters of said internal gear and said external gear; and means for synchronizing the rotational movement of said eccentric about the drive shaft with respect to the rotational movement of said rotor about said eccentric as said longitudinal axis of said eccentric orbits about the longitudinal axis of the drive shaft to control the epicyclic motion of the rotor.

2. An apparatus of claim 1 wherein the rotor has at least two spaced-apart lobes, the drive shaft extending through a chamber defined within a stator and being mounted in the stator to position the rotor within the chamber; said means for synchronizing the rotational movement of said eccentric includes a gear train which transmits to said eccentric the rotational movement of the drive shaft as the rotor rotates about said eccentric, excepting when a gear ratio between the internal gear and the external gear precludes rotation of the drive shaft; the speed ratio of the angular velocity of the eccentric to the angular velocity of the rotor being equal to the number of spaced-apart lobes so that said eccentric rotates a number of times equal to the number of lobes on the rotor for each revolution of the rotor; the overall gear ratio of the gear train from the drive shaft to the eccentric being predetermined by the number of spaced-apart lobes on the rotor so that the eccentric rotates a number of times equal to the number of lobes for each revolution of the rotor.

3. An apparatus of claim 2 wherein said gear train comprises a first gear secured to said drive shaft, first and second interconnected back gears and a second gear mounted on the drive shaft which is adapted to rotate freely of the drive shaft; said first and second back gears being mounted on a lay shaft which is positioned within the stator such that said first back gear engages said first gear and the second back gear engages said second gear; said second gear being connected to said eccentric thereby rotating said eccentric at the angular velocity of said second gear; the overall gear ratio between said first gear and said second gear being predetermined by the number of lobes on said rotor to rotate said eccentric and the rotor at said speed ratio; said first gear and said first back gear being eliminated when a gear ratio between said internal gear to said external gear precludes rotation of the drive shaft.

4. An apparatus of claim 1 where said eccentric has a cavity formed therein of sufficient size to accommodate said means for synchronizing the rotational movement of said eccentric which comprises a first gear secured to said drive shaft with its axis coincident with the axis of said drive shaft; first and second back gears secured to a lay shaft with their axes coincident with the axis of said lay shaft; said lay shaft being rotatably mounted within said cavity with its axis parallel to the axis of said drive shaft and displaced from the axis of said drive shaft one half the sum of the pitch diameters of said first gear and said first back gear; said stator side wall including a cylindrical body portion protruding into cavity, the axis of said cylindrical body portion being coincident with the drive shaft axis, said drive shaft being permitted to rotate within said cylindrical portion, the inner extremity of said cylindrical body portion including a second gear secured thereto with its axis coincident with the drive shaft axis and permitting the drive shaft to rotate relative to said second gear; said lay shaft being positioned within said cavity such that said first and second back gears engage said first and second gears respectively; the gear ratio between said internal gear and said external gear being such to permit said drive shaft to rotate, the rotational movement of said drive shaft being transferred to said first and second back gears by said first gear to move said lay shaft in a uniform circular motion about said drive shaft thereby rotating said eccentric about said drive shaft relative to the rotational movement of said rotor; the gear ratios between said first and second gears and said first and second back gears being such that said eccentric rotates relative to said rotor at said speed ratio; and wherein said eccentric having said cavity formed therein defines two opposing partition walls, said drive shaft passing through both of said partition walls and one of said partition walls including a first bearing means which contacts said drive shaft and the other of said partition walls including a second bearing means which contacts said cylindrical body portion of said stator to isolate said cavity.

5. An apparatus of claim 1 wherein said stator has opposing side walls and a circumferential wall defining said chamber, means being provided on each side of said rotor to sealably engage the respective side walls of said chamber; the tip of each said lobe slidably contacting said circumferential wall to define a number of isolated zones equal to the number of said lobes; said means for synchronizing the rotational movement of said eccentric being operative to position a line drawn through the centres of said internal and external gears and their point of contact at substantially right angles to a line drawn between any two rotor tips whenever the volume of the respective isolated zone defined by the two rotor tips is at a minimum.

* * * * *